(12) United States Patent
Schütz et al.

(10) Patent No.: US 12,533,009 B2
(45) Date of Patent: Jan. 27, 2026

(54) STEERING ASSEMBLY FOR AN ENDOSCOPE, IN PARTICULAR FOR A SINGLE USE ENDOSCOPE

(71) Applicant: AMBU A/S, Ballerup (DK)

(72) Inventors: Jakob Schütz, Neusäß (DE); Günter Wilhelm Schütz, Augsburg (DE); Daniel Bernd Roppenecker, Pürgen (DE); Martin Refslund Nielsen, Birkerød (DK); Jan Guldberg Hansen, Greve (DK)

(73) Assignee: AMBU A/S, Ballerup (DK)

( * ) Notice: Subject to any disclaimer, the term of this patent is extended or adjusted under 35 U.S.C. 154(b) by 492 days.

(21) Appl. No.: 17/922,060

(22) PCT Filed: Apr. 29, 2021

(86) PCT No.: PCT/EP2021/061353
§ 371 (c)(1),
(2) Date: Oct. 28, 2022

(87) PCT Pub. No.: WO2021/219832
PCT Pub. Date: Nov. 4, 2021

(65) Prior Publication Data
US 2023/0172429 A1    Jun. 8, 2023

(30) Foreign Application Priority Data
Apr. 30, 2020  (DE) .................... 10 2020 111 885.6

(51) Int. Cl.
*A61B 1/00*    (2006.01)
*A61B 1/005*    (2006.01)

(52) U.S. Cl.
CPC ........ *A61B 1/00064* (2013.01); *A61B 1/0052* (2013.01)

(58) Field of Classification Search
CPC ..... A61B 1/005; A61B 1/0051; A61B 1/0052; A61B 1/0053; A61B 1/0055;
(Continued)

(56) References Cited

U.S. PATENT DOCUMENTS

| 4,461,282 A | 7/1984 | Ouchi et al. |
| 4,473,301 A | 9/1984 | Namyslo |

(Continued)

FOREIGN PATENT DOCUMENTS

| DE | 3714561 C2 | 10/2003 |
| EP | 2889010 B1 | 5/2017 |

(Continued)

OTHER PUBLICATIONS

International Search Report and Written Opinion received for PCT Patent Application No. PCT/EP2021/061353, mailed on Jul. 26, 2021, 12 pages.

(Continued)

*Primary Examiner* — Ryan N Henderson
(74) *Attorney, Agent, or Firm* — Faegre Drinker Biddle & Reath LLP (57) ABSTRACT

A steering assembly for an endoscope, the steering assembly including a first steering member rotatable around a rotation axis for bending a tip of the endoscope in a first directional plane, a second steering member rotatable around the rotation axis for bending the tip of the endoscope in a second directional plane, a first shaft mechanically engaged by a first form locking key connection with the first steering member for transmitting a torque induced by the first steering member to a first wire drum, a second shaft mechanically engaged by a second form locking key connection with the second steering member for transmitting a torque induced by the second steering member to a second (Continued)

wire drum, wherein the first shaft and the second shaft are arranged coaxially to each other.

18 Claims, 5 Drawing Sheets

(58) Field of Classification Search
CPC ... A61B 1/0056; A61B 1/0057; A61B 1/0058; A61B 1/00064; A61B 2017/00318; A61B 2017/00323; A61M 25/0133; A61M 25/0136; A61M 25/0147
See application file for complete search history.

(56) References Cited

U.S. PATENT DOCUMENTS

| | | | |
|---|---|---|---|
| 4,742,816 A * | 5/1988 | Suzuki | A61B 1/0052 600/134 |
| 4,924,852 A | 5/1990 | Suzuki et al. | |
| 5,269,202 A | 12/1993 | Kiyosawa et al. | |
| 5,329,887 A | 7/1994 | Ailinger et al. | |
| 5,426,992 A | 6/1995 | Morii et al. | |
| 5,496,260 A | 3/1996 | Krauter et al. | |
| 5,512,035 A | 4/1996 | Konstorum et al. | |
| 7,633,837 B2 | 12/2009 | Daout | |
| 7,735,396 B2 | 6/2010 | Ishikawa et al. | |
| 7,926,379 B2 | 4/2011 | Gutmann et al. | |
| 8,042,423 B2 | 10/2011 | Bannier et al. | |
| 8,048,025 B2 | 11/2011 | Barenboym et al. | |
| 8,302,507 B2 | 11/2012 | Kanai | |
| 8,808,168 B2 | 8/2014 | Ettwein et al. | |
| 8,845,521 B2 | 9/2014 | Maruyama | |
| 8,904,894 B2 | 12/2014 | Geiser | |
| 9,057,421 B2 | 6/2015 | Ishikawa et al. | |
| 9,155,865 B2 | 10/2015 | Golden et al. | |
| 9,360,098 B2 | 6/2016 | Roopnarine | |
| 9,394,985 B2 | 7/2016 | Kobayashi et al. | |
| 9,534,681 B2 | 1/2017 | Ishikawa | |
| 9,833,131 B2 | 12/2017 | Golden et al. | |
| 10,197,153 B2 | 2/2019 | Dumanski et al. | |
| 10,203,022 B2 | 2/2019 | Atmur et al. | |
| 2007/0255104 A1 | 11/2007 | Maruyama | |
| 2010/0268031 A1* | 10/2010 | Koyama | A61B 1/0051 600/146 |
| 2011/0088498 A1* | 4/2011 | Ettwein | A61M 25/0136 74/479.01 |
| 2013/0204096 A1 | 8/2013 | Ku et al. | |
| 2014/0058323 A1* | 2/2014 | Hoshino | G02B 23/2476 604/95.04 |
| 2014/0142389 A1 | 5/2014 | Lim et al. | |
| 2014/0343489 A1* | 11/2014 | Lang | A61B 1/00147 604/95.04 |
| 2015/0045621 A1 | 2/2015 | Masaki | |
| 2015/0359415 A1* | 12/2015 | Lang | A61M 25/0147 600/141 |
| 2017/0265719 A1* | 9/2017 | Koyama | G02B 23/24 |
| 2018/0110517 A1 | 4/2018 | Baxter et al. | |
| 2019/0029498 A1 | 1/2019 | Mankowski et al. | |
| 2022/0218306 A1* | 7/2022 | Peszynski | A61B 8/0883 |

FOREIGN PATENT DOCUMENTS

| | | |
|---|---|---|
| WO | 2008023965 A1 | 2/2008 |
| WO | 2018022402 A1 | 2/2018 |

OTHER PUBLICATIONS

Search report in German Patent Application No. 10 2020 111 885.6, dated Mar. 16, 2021, 16 pages (8 pages of English translation and 8 pages of original document).

* cited by examiner

STEERING ASSEMBLY FOR AN ENDOSCOPE, IN PARTICULAR FOR A SINGLE USE ENDOSCOPE

CROSS REFERENCE TO RELATED APPLICATIONS

This application is a National Stage entry under 35 U.S.C. § 371 of International Application No. PCT/EP2021/061353, filed Apr. 29, 2021, which claims priority from and the benefit of German Patent Application No. DE 10 2020 111 885.6, filed Apr. 30, 2020; said applications are incorporated by reference herein in their entirety.

BACKGROUND

The present disclosure refers to a steering assembly for an endoscope, in particular for a single use endoscope, the steering assembly comprising a first steering member rotatable around a rotation axis for bending a tip of the endoscope in a first directional plane and a second steering member rotatable around the rotation axis for bending the tip of the endoscope in a second directional plane.

Endoscopes and similar specialized instruments as bronchoscopes, arthroscopes, colonoscopes, laparoscopes and in particular duodenoscopes are well known from the state of the art and are used for visual examination and diagnosis as well as to assist in surgery. A conventional endoscope generally consists of a connector unit for connecting the endoscope with a supply unit for fluids, gas, light and energy, a control handle connected to the connector unit by a connecting hose/tube and an elongated insertion tube/insertion hose, which on its proximal end (as seen from the operator) is connected to the control handle and on its distal end carries a tip (endoscope tip, duodenoscope tip). In particular in the case of duodenoscopes the tip is an articulating tip, i.e. a tip that can be moved and bent into different directions, and contains several components including illuminating means such as light-emitting diodes or fiber optic light guides connected to a proximal source of light, image capturing means such as a miniature video camera, and an elevator for a working instrument like e.g. a forceps elevator.

At this point, the expressions "distal" and "proximal" are defined for the whole application (including the description of the invention) as follows:
Distal: In the direction away from a user (toward the patient)
Proximal: In the direction toward the user (away from the patient)

The control handle usually comprises two steering members for operating the endoscope to perform a controlled/precise movement of the articulating tip. A first steering member is used for moving the tip in a first plane of movement (first directional plane), while a second steering member is used for moving the tip in a second plane of movement (second directional plane) perpendicular the first plane of movement. It is well known to provide such steering members in form of steering wheels or hand wheels.

Prior Art

In known endoscopes the steering members as well as the shafts at least in part are made from metal. In particular the form locking key connections between the first steering member and the first shaft as well as between the second steering member and the second shaft are made from metal. By providing these parts/elements of the control handle from metal, a very high accuracy/precision as well as stability/rigidity over a long lifetime can be achieved, such that a surgeon while operating the steering members gets a very good haptic feedback of the movements of the tip. A significant drawback of such common devices made at least in part from metal is the high costs, such that they are less suited for single use endoscopes. A further drawback is, that such devices are rather long in the direction of the rotation axis and that they are heavy.

For example, DE 37 14 561 C2 discloses an operating device for an endoscope with a plurality of operating sections having first and second operating sections, said operating device comprising:
an operating body including a casing having a through hole and a rotation shaft externally extending through the through hole,
a first operation unit for operating the first operating section, said first operation unit having a base section located outside the casing such that it is rotatably mounted on the rotation shaft, and an extension section extending radially from the base section and having a finger-operated member at an outer end portion,
a second operation unit having a base section located outside the first operation unit such that it is rotatably mounted on the rotation shaft, and an extension section extending radially from the base section and having an intermediate portion bent toward the casing and a button attached to an outer end portion, said rotation path of the button being created over the same plane as that of said finger-operated member such that it is spaced apart from the rotation path of said finger-operated member at a predetermined angle, and
operation means located outside said second operation unit such that it is rotatably mounted on said rotation shaft, said operation means operating the other associated operation sections.

Due to the above problems, common endoscope steering assemblies are less suited for use in emergency medicine and mobile entities as ambulances, rescue helicopters and life boats.

SUMMARY OF THE INVENTION

Against this background, the object of the present disclosure is to reduce the mentioned disadvantages of the prior art, and in particular to provide a steering assembly for an endoscope, which is lightweight, cost efficient, has a high accuracy during operation, requires less space than known steering devices and in particular is very well suited for single use devices and to be discarded after use.

This object is achieved according to the present disclosure by a steering assembly according to claim 1, i.e. a steering assembly for an endoscope, in particular for a single use endoscope (preferably duodenoscope), the steering assembly comprising a first steering member (steering wheel) rotatable around a rotation axis for bending a distal tip of the endoscope in a first directional plane, a second steering member (preferably steering wheel) rotatable around the rotation axis for bending the tip of the endoscope in a second directional plane (which preferably is perpendicular to the first directional plane), a first shaft mechanically engaged by a first form locking key connection with the first steering member for transmitting a torque induced by the first steering member to a first wire drum, a second shaft mechanically engaged by a second form locking key connection with the second steering member for transmitting a torque induced by the second steering member to a second wire drum, wherein the first shaft and the second shaft are arranged coaxially to each other.

According to a first preferred aspect, the present disclosure relates to a steering assembly for an endoscope, in particular for a single use endoscope (preferably duodenoscope), the steering assembly comprising a first steering member (steering wheel) rotatable around a rotation axis for bending a distal tip of the endoscope in a first directional plane, a second steering member (preferably steering wheel) rotatable around the rotation axis for bending the tip of the endoscope in a second directional plane (which preferably is perpendicular to the first directional plane), a first shaft mechanically engaged by a first form locking key connection with the first steering member for transmitting a torque induced by the first steering member to a first wire drum, a second shaft mechanically engaged by a second form locking key connection with the second steering member for transmitting a torque induced by the second steering member to a second wire drum, wherein the first shaft and the second shaft are arranged coaxially to each other, wherein the first form locking key connection and/or the second form locking key connection comprises/comprise conical form locking elements engaging each other.

According to a second preferred aspect the present disclosure relates to a steering assembly for an endoscope, in particular for a single use endoscope, the steering assembly comprising a first steering member rotatable around a rotation axis for bending a tip of the endoscope in a first directional plane, a second steering member rotatable around the rotation axis for bending the tip of the endoscope in a second directional plane (which preferably is perpendicular to the first directional plane), a first shaft mechanically engaged by a first form locking key connection with the first steering member for transmitting a torque induced by the first steering member to a first wire drum, a second shaft mechanically engaged by a second form locking key connection with the second steering member for transmitting a torque induced by the second steering member to a second wire drum, wherein the first shaft and the second shaft are arranged coaxially to each other, wherein the second form locking key connection is arranged at least in part axially inside the first form locking key connection, in particular completely axially inside the first form locking key connection.

A steering assembly according to the disclosure can also be referred to as an operating assembly for an endoscope, in particular for a single use endoscope, which is intended to be discarded after a first (single) use. The steering assembly is designed for bending/moving the tip of the endoscope in two different directions/directional planes, which preferably are perpendicular to each other. In particular, the tip may be bent in a first direction/lateral direction/lateral directional plane, which is perpendicular to the longitudinal direction (direction proximal—distal) of the endoscope, and in a second direction/height direction/height directional plane, which is perpendicular to the longitudinal direction as well as to the first direction/lateral direction/lateral directional plane. For bending/moving the tip the endoscope comprises wires/bending wires. At least one first wire is connected on the one hand to the first shaft and at least one second wire is connected on the one hand to the second shaft. On the other hand, the first wire and the second wire are connected to the tip, such that by turning/rotating the first shaft around the rotating axis the tip is bent/moved in the first direction and by turning/rotating the second shaft around the rotating axis the tip is bent/moved in the second direction, as it is well known from prior art endoscope moving devices.

The first steering member and the second steering member preferably are hand wheels. The first shaft and/or the second shaft may be designed with or provided with wire drums for guiding/holding the wires, which wire drums may be attached to the shafts or may be monolithically formed with the concerning shaft. Further, the first shaft and/or the second shaft each may be hollow. The first shaft in particular may be arranged on/supported by/pivoted on a central axis/stud, which is connected to or which is a part of the operating assembly, in particular connected to a part of a housing or a base plate or similar of the operating assembly.

According to the first aspect of the disclosure, the first form locking key connection comprises conical form locking elements engaging each other. Additionally, or alternatively, the second form locking key connection comprises conical form locking elements engaging each other. Such form locking key elements in particular may consist of a combination of at least one radial protrusion provided for example on the steering member engaging with at least one radial depression/recess provided on the shaft, or vice versa. The combination protrusion—depression/recess in particular may be a combination of key—keyway or groove—spline/tooth/ridge or similar. Preferably, the form locking elements of both engaging parts, steering member and shaft, are conical. By providing such conical form locking elements, any play between the concerning steering member and the concerning shaft can be eliminated, at least significantly reduced, such that a surgeon while operating the steering members gets a very good haptic feedback of the movements of the tip and any movement can be executed with high precision.

According to the second, further aspect of the disclosure, which according to the invention can be combined with the aforementioned first aspect, the second form locking key connection is arranged at least in part axially inside the first form locking key connection, in particular completely axially inside the first form locking key connection. One can say that the second form locking key connection is nested within the first form locking key connection. Such a design provides the advantage of a short length in the direction of the rotating axis. Further, by nesting the form locking key connections, the length of each of the first form locking key connection and the second form locking key connection may be enlarged, such that higher forces and/or torques can be transferred between the concerning steering member and the concerning shaft. In result, the invention provides a very compact and lightweight design of the steering assembly. In particular, the first form locking key connection and the second form locking key connection may overlap each other in the direction of the rotation axis (axial direction of the first shaft and the second shaft).

One preferred embodiment is characterized in that the form locking elements are conical in a direction radial to the rotation axis. This allows for a very good compensation of any play in the radial direction. Additionally or alternatively, the form locking elements are conical in the direction of the rotation axis. This allows for a very good compensation of any play in the direction of the rotation axis.

According to a further preferred embodiment, the form locking elements may comprise deformation areas. Such deformation areas are suitable and adapted to reduce or eliminate any play between the first steering member and the first shaft and/or between the second steering member and the second shaft. The deformation areas are very effective if the material of the form locking elements has a suitable elastic and/or plastic deformation ability. Such a material for example may be a plastic/resin material, which easily deforms (elastically and/or plastically) when the form locking elements are under a certain load caused by their mutual contact.

According to a preferred embodiment, the first steering member and the first shaft are made from plastic/resin. Additionally or alternatively, the second steering member and the second shaft each are made from plastic/resin. The steering members and the shaft may be entirely made from plastic/resin. Otherwise at least the first form locking key and/or the second form locking key is/are made from plastic/resin. Plastic is a material comprising several advantages compared to metal. It is very light and can be formed in a wide variance of different geometries, in particular by manufacturing methods as injection molding. The parts of the steering assembly formed by plastic/resin and such manufacturing methods are very cost effective, in particular when produced in high number. They are further very well suited for single use endoscopes, as they can easily be discarded and/or recycled after use.

A further preferred embodiment is characterized in that the form locking elements of the first form locking key connection and/or the second form locking key connection comprise/comprises a plurality of grooves and a plurality of splines, respectively. Such grooves and splines may be arranged parallel to the rotation axis, i.e. parallel to the axis of the first shaft and second shaft, respectively. They further may be arranged as extending in the radial direction (star-like). Alternatively, they may be arranged parallel to each other, i.e. they are in particular not arranged radially/in a direction radial to the rotating axis, in which case one can say that the teeth and grooves on opposing sides of the rotation axis are arranged diametrically and secantically with regard to each other. Such a design is very well suited for plastic engineering, and in particular provides an excellent release properties/demoldability when made by injection molding.

According to a further preferred embodiment, the second steering member is arranged in the direction of the rotation axis above the first steering member. Preferably, the second steering member has a smaller diameter than the first steering member, such that both steering members easily and securely can be grasped by a surgeon.

Preferably, the second steering member comprises a hollow cylindrical socket part extending in the direction of the rotating axis and being provided with the form locking elements of the second form locking key connection. The socket part preferably engages into a clearance between the first shaft and the second shaft. In particular, the socket part may be nested with the first shaft, the second shaft, the first steering member and as the case may be a central supporting axis. This provides a short length of the assembly in the direction of the rotation axis, while at the same time allowing a large contact area of/for the form locking key connections. Contrary to metal parts, such a design can easily be provided by the use of plastic/resin, for example by injection molding.

Preferably, the form locking elements of the first shaft engage into a central opening of the first steering member, preferably wherein the second shaft is arranged within the first shaft. This further reduces the length of the assembly and provides a very good mountability of the steering assembly.

With other words one can say that the disclosure provides a mechanical control assembly for connecting the hand wheels and the wire drums of an endoscope for moving an endoscope tip, which assembly comprises a shaft with a cross sectional shape as a gear wheel.

In summary, it can be said that the disclosure in particular may provide the following advantages:
- the mechanical control assembly is very well suited for a single use endoscope
- large area of contact between shaft and hub
- ability to transmit high forces and torques
- robust design in plastic material
- conical shape increases the press fit between connected shafts and hand wheels
- provision of deforming areas in connection parts
- ability of deformation of connection parts to reduce clearance between the connection parts
- very direct transmission of forces and torques and therefore very direct feedback to the surgeon

BRIEF DESCRIPTION OF THE FIGURES

Further features and advantages of the present disclosure will follow from the exemplary and non-limiting description of the figures. These are only schematic in nature and only serve to understand the disclosure.

DESCRIPTION OF THE PREFERRED EMBODIMENTS

Figure 8:
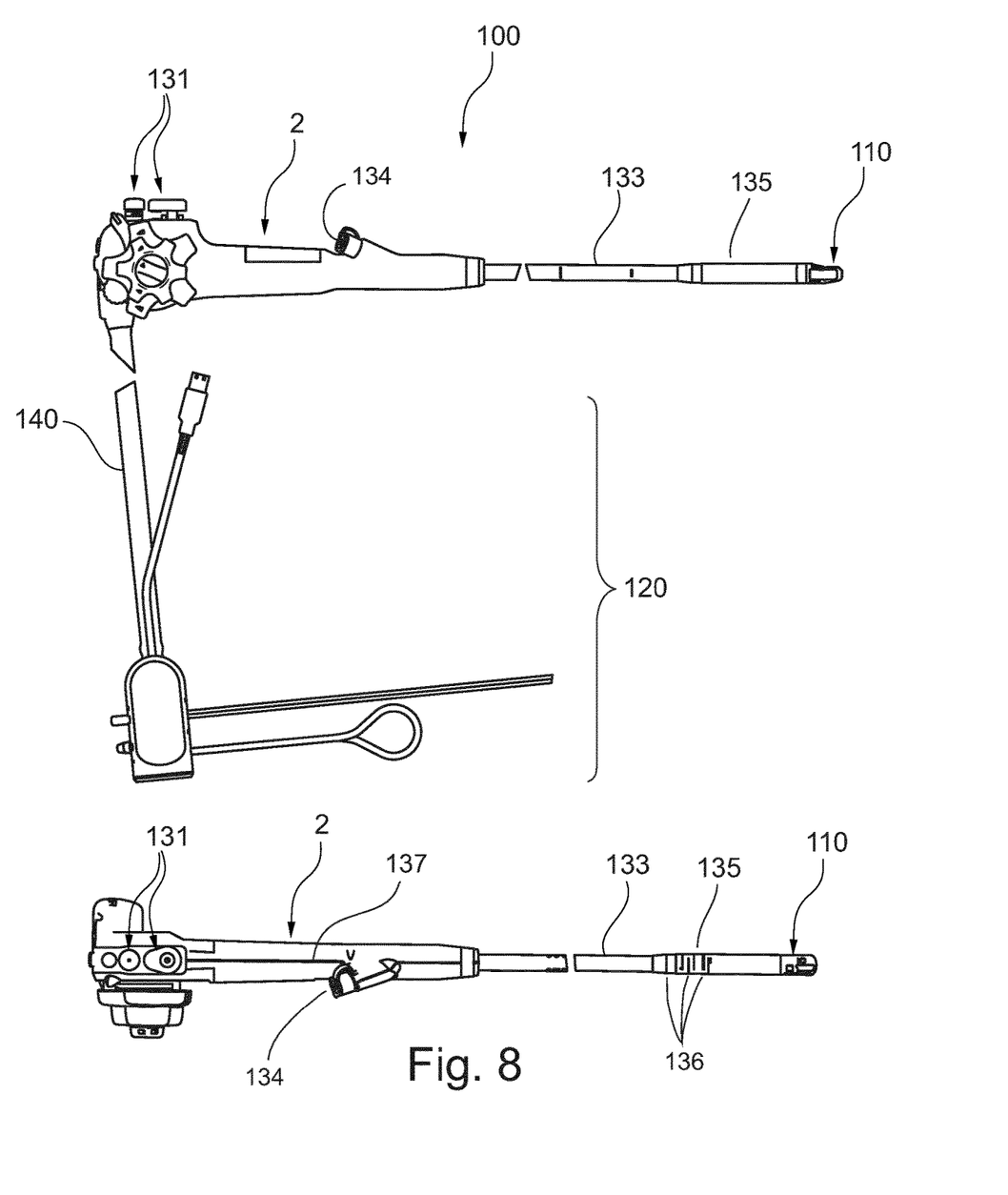

To begin with, FIG. 8 shows the endoscope 100 of the present disclosure in its substantially complete structure.

Accordingly, the endoscope 100 is preferably a single use endoscope (duodenoscope) and comprises a connector unit 120 for connecting the endoscope 100 with a (separate) supply unit, which may also be referred to as a base unit, for at least one operating resource (for example, electric power, water, etc.). The endoscope 100 further comprises a supply line 140 located proximal (in the direction toward the user) to/at the connector unit 120. The supply line 140 is for supplying said at least one operating resource from the connector unit 120 to an endoscope handle or handle unit 2 which is designed to be held by an user and—in accordance with the manual actuations of several manipulators 131 at the handle 2 by the user—from the handle 2 to a distal (direction away from the user/direction toward the patient) endoscope tip/head 110 (shown in FIG. 1), which is intended to be inserted into a patient's body cavity and which is located at the distal end of an endoscope shaft 133 which shaft 133 is mounted at its proximal end to the handle 2 and into which the supply line 140 is extended. Furthermore, the endoscope shaft 133 comprises at least one so-called working channel 134 extending along the endoscope shaft 133 and having an opening in the tip 110 such that a surgical instrument can be shifted through the working channel 134 to extend beyond the tip 110 into a distal and/or radial direction.

For manually moving/tilting the endoscope tip 110 a so-called deflecting portion 135 is provided between the distal end of the endoscope shaft 133 and the endoscope tip 110 comprising a number of distally separated segments 136 being hinged to each other such that the deflection portion 135 is bendable/tiltable in accordance with the manipulation amount at actuating elements in the form of steering/hand wheels 4, 5.

Finally, in order to transmit the actuating action from the hand wheels 4, 5 to the deflecting 135 a number of steering wires 137, preferably four steering wires or lines are movably fed through the endoscope shaft 133. These steering wires 137 are distally connected to the endoscope tip 110 or to the final distal segment of the deflecting portion 135 wherein the proximal ends of the steering wires 137 are linked to rotational drums 11, 12, each of which are connected with one of the hand wheels 4, 5.

Figure 1:
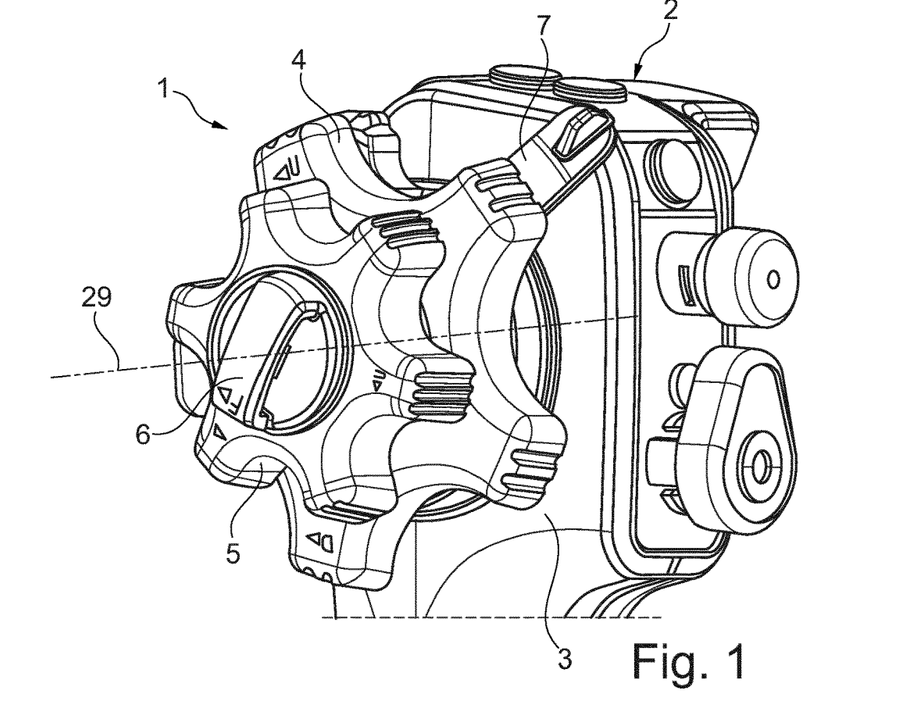
FIG. 1 shows a perspective view of an example of a mechanical steering assembly according to the present disclosure.

FIG. 1 now shows a perspective view of an example of a mechanical steering assembly 1 for a single use endoscope, the assembly 1 comprising the handle unit 2 with a housing 3. The handle unit 2 provides a handle for a surgeon/user for holding the endoscope during use with one hand, while with the other hand operating the steering assembly 1 for moving the tip 110 of the endoscope 100.

The steering assembly 1 further comprises a first steering member 4 rotatable around a rotation axis 29, here in form of a first steering hand wheel 4, a second steering member 5 rotatable around the rotation axis 29, here in form of a second steering hand wheel 5, a first brake operating member 6 for blocking and/or impeding movement/operation of the first steering member 4 and a second brake operating member 7 for blocking and/or impeding movement/operation of the second steering member 5. The first steering member 4 and the second steering member 5 are mechanically connected to a mechanism provided inside the housing 3 of the handle unit 2. This mechanism comprises inter alia a central supporting axis 8, a first shaft 9 rotatable around the rotation axis 29, a second shaft 10 rotatable around the rotation axis 29, a first wire drum 11 and a second wire drum 12 as already mentioned above (see in particular in FIGS. 3 and 5). The second shaft 10 is rotatably supported by a central supporting axis/bar 8 (provided within the second shaft 10). The first shaft 9 is rotatably supported by the second shaft 10 (provided within the first shaft 9).

Figure 3:
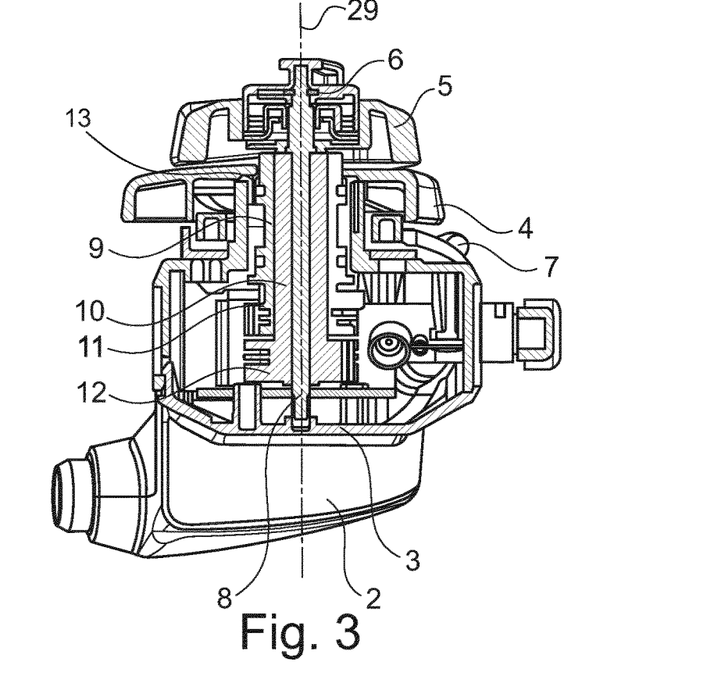
FIG. 3 shows a sectional view of the example of the mechanical steering assembly of FIG. 1 taken along its rotational axis.
Figure 4:
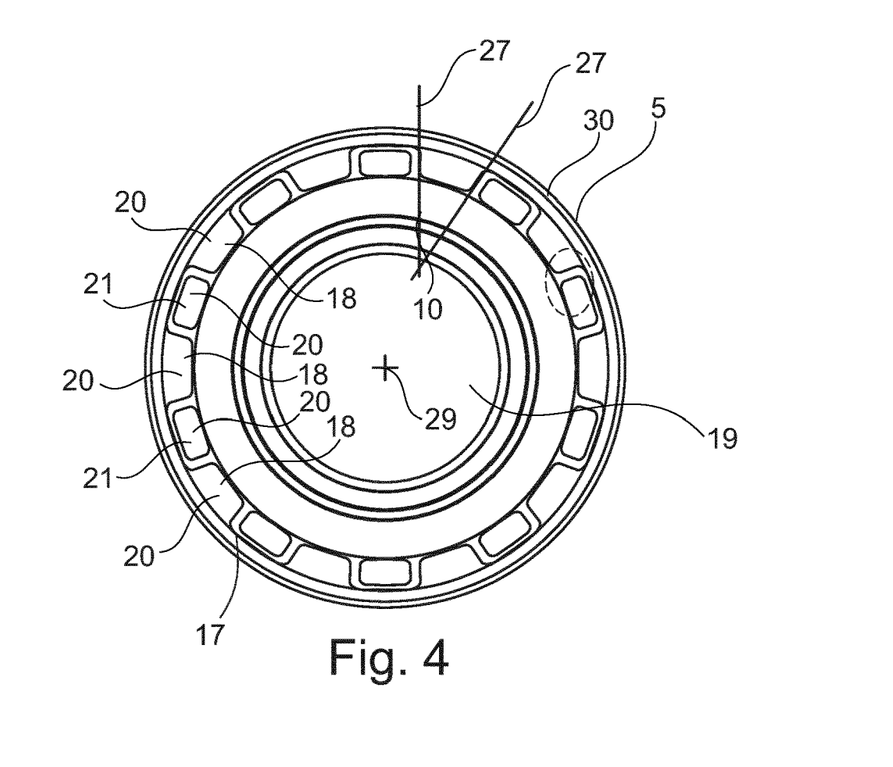
FIG. 4 shows a plan view of the engagement structure between the second hand wheel and the second shaft.
Figure 5:
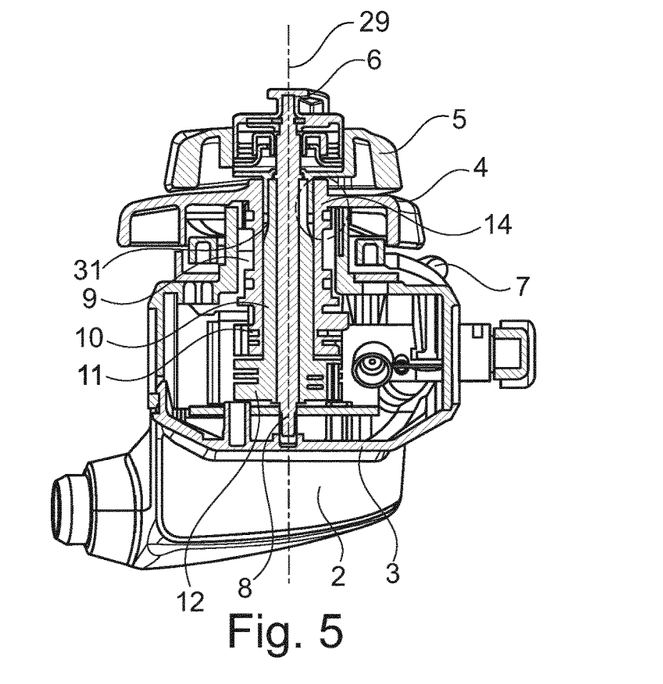
FIG. 5 shows a sectional view of the example of the mechanical steering assembly of FIGS. 1 and 3 taken along its rotational axis.

The first shaft 9 is mechanically engaged at one end to the first steering member 4 by a first form locking key connection 13, such that a torque induced by the first steering member 4 is transferred to the first shaft 9. On its opposite end the first shaft 9 is provided with the first wire drum 11, such that the torque is further transferred to the first wire drum 11. The second shaft 10 is mechanically engaged on its one end to the second steering member 5 by a second form locking key connection 14, such that a torque induced by the second steering member 5 is transferred to the second shaft 10. On its opposite end the second shaft 10 is provided with the second wire drum 12, such that the torque is further transferred to the second wire drum 12. The first shaft 9 and the first wire drum 11 are monolithically formed by injection molding of a plastic/resin material. Similarly, the second shaft 10 and the second wire drum 12 are monolithically formed by injection molding of a plastic/resin material. The first wire drum 11 engages with a first steering wire (not shown in the drawings), while the second wire drum 12 engages with a second steering wire (also not shown in the drawings).

Each wire drum 11, 12 comprises two branches, one of the branches being connected to one side of the tip of the endoscope and the other of the branches being connected to the opposing side of the tip. The first steering wire is for moving/bending the tip in a first plane, here in height directional plane, which is perpendicular to the longitudinal direction. The second steering wire is for moving the tip in a second plane, here in a lateral directional plane, which is perpendicular to the longitudinal direction (direction proximal—distal) of the endoscope as well as to the height directional plane (first plane). Therefore, by turning the first steering member 4 in a first direction, e.g. clockwise, the tip is bent/moved in a first height direction, e.g. upwards. By turning the first steering member 4 in a second direction, e.g. here counterclockwise, the tip is bent/moved in a second, opposite height direction, e.g. here downwards. Similarly, by turning the second steering member 5 in a first direction, e.g. clockwise, the tip is bent/moved in a first lateral direction, e.g. to the left. By turning the second steering member 5 in a second direction, e.g. here counterclockwise, the tip is bent/moved in a second, opposite lateral direction, e.g. here to the right.

As in particular shown in FIGS. 1, 3, and 5, the diameter of the first steering member 4 is bigger than the diameter of the second steering member 5. Further, both steering members 4, 5 are formed in a rounded star like shape with operating protrusions 15 and operating recesses 16 there between. This is to allow easy grasping of both steering members 4, 5 by the surgeon.

FIGS. 3 and 5 each show a sectional view of the steering assembly 1 taken along its rotational axis 29, wherein in FIG. 5 those parts interacting with the second steering member 5 are highlighted, while in FIG. 3 those parts interacting with the first steering member 4 are highlighted.

FIGS. 2 to 5 show the second form locking key connection 14 between the second steering member 5 and the second shaft 10. As especially shown in FIGS. 2 and 4, the second shaft 10 on its end section is provided with a plurality of grooves/splines 17 and teeth/blocks 18 extending radially outwards and arranged in an alternating manner around the entire end section of the second shaft 10. The second steering member 5 is provided with a central socket part 30 around a central opening 19, which correspondingly is provided with a plurality of grooves/splines 20 and teeth/blocks 21 extending radially inwards and arranged in an alternating manner around the entire central opening 19. The teeth/blocks 18 of the second shaft 10 engage into the grooves/splines 20 of the second steering member 5. Correspondingly, the grooves/splines 17 of the second shaft 10 engage into the teeth/blocks 21 of the second steering member 5. As particularly indicated by lines 27 in FIG. 4, the form locking elements 17, 18, 20, 21 of the second form locking key connection 14 each are conical, here conical in the radial direction, such that a press fit between the form locking elements 17, 18, 20, 21 is increased thereby removing/eliminating any play between the second steering member 5 and the second shaft 10.

Figure 6:
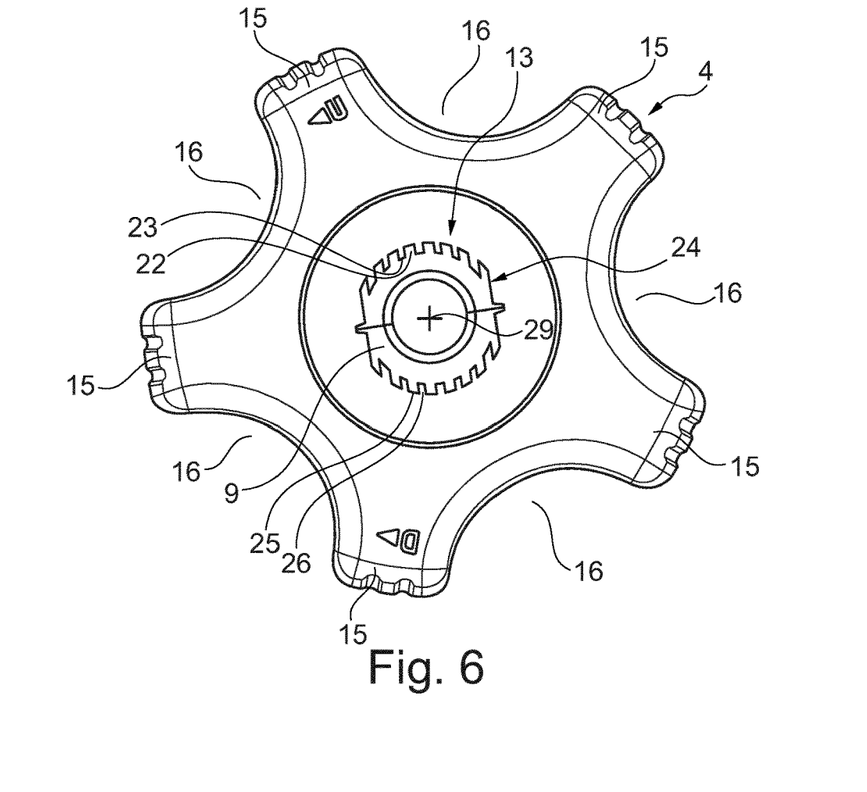
FIG. 6 shows a plan view of the engagement structure between the first hand wheel and the first shaft.
Figure 7:
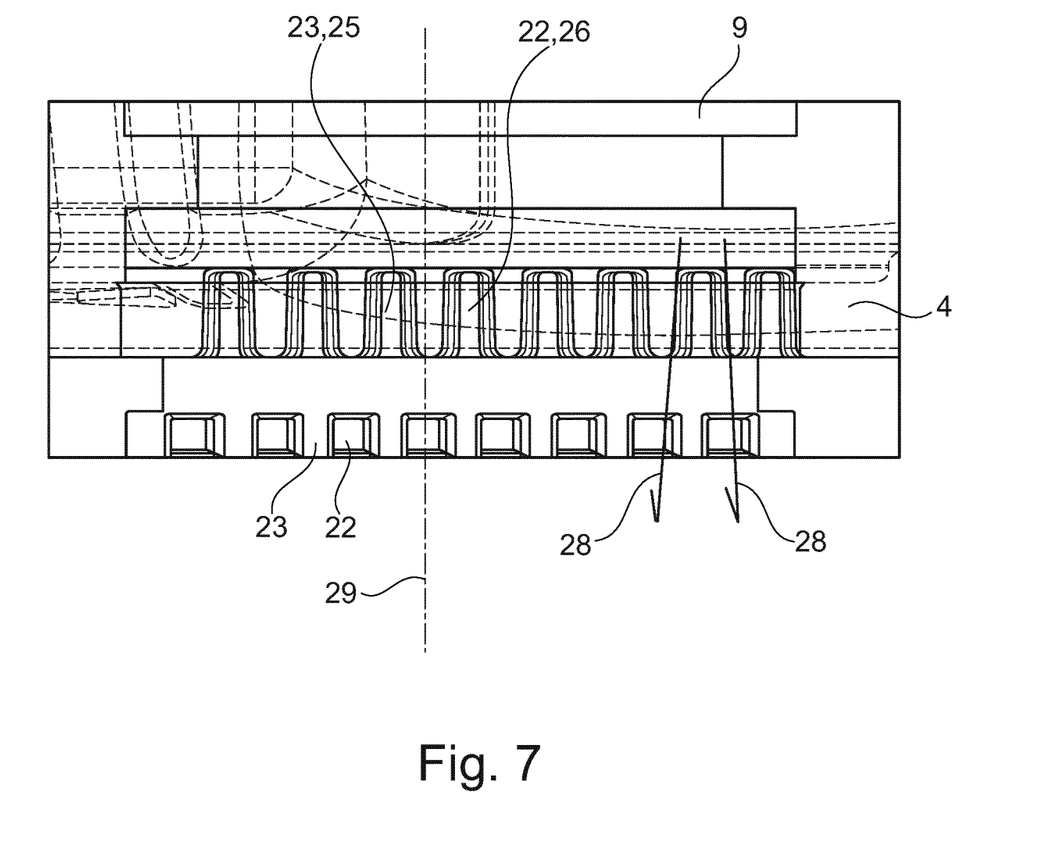
FIG. 7 shows a side view of the engagement structure between the first hand wheel and the first shaft and FIG. 8 shows an embodiment of an endoscope preferably duodenoscope according to the present disclosure.

FIGS. 3, 6 and 7 show the first form locking key connection 13 between the first steering member 4 and the first shaft 9. As especially shown in FIGS. 6 and 7, the first shaft 9 on its end section is provided with a plurality of grooves/splines 22 and teeth/blocks 23 extending secantically outwards and arranged in an alternating manner around a part of the end section of the second shaft 10. The first steering member 4 is provided with a central opening 24, which correspondingly is provided with a plurality of grooves/splines 25 and teeth/blocks 26 extending secantically inwards and arranged in an alternating manner around a part of the central opening 19. The teeth/blocks 23 of the second shaft 9 engage into the grooves/splines 25 of the second steering member 4. Correspondingly, the grooves/splines 22 of the second shaft 9 engage into the teeth/blocks 26 of the second steering member 4. As particularly indicated by lines 28 in FIG. 7, the form locking elements 22, 23, 25, 26 of the first form locking key connection 13 each are conical, here conical in the direction of the rotation axis 29, such that a press fit between the form locking elements 22, 23, 25, 26 is increased thereby removing/eliminating any play between the first steering member 4 and the first shaft 9.

Figure 2:
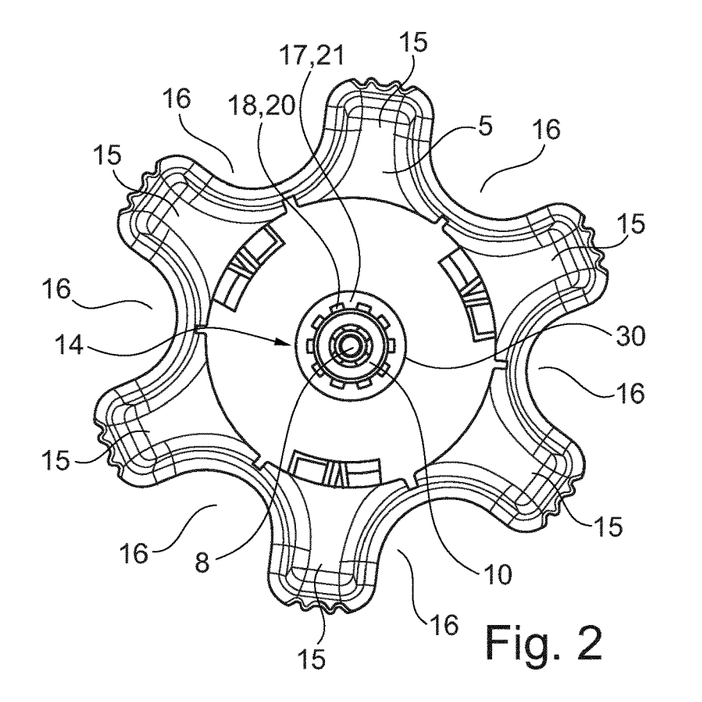
FIG. 2 shows a plan view of an example of a second hand wheel of a mechanical steering assembly according to the present disclosure.

As in particular shown in FIG. 2, the central socket part 30 of the second steering member 5 protrudes in the direction of the rotating axis 29 form the plane of the second steering member 5 and engages into a ring like clearance 31 between the first shaft 9 and the second shaft 10. Therefore, the second form locking key connection 14 is completely arranged axially inside the first form locking key connection 14/the second form locking key is nested within the first form locking key. In the result, there is provided a short length in the direction of the rotating axis 29 and the length of each of the first form locking key connection 13 and the second form locking key connection 14 are larger than in known devices, such that higher forces and/or torques can be transferred between the concerning steering member 4, 5 and the concerning shaft 9, 10.

REFERENCE SIGNS 1 steering assembly
2 handle unit
3 housing
4 first steering member, first hand wheel
5 second steering member, second hand wheel
6 brake operating member
7 operating member
8 central supporting axis
9 first shaft
10 second shaft
11 first wire drum
12 second wire drum
13 first form locking key connection
14 second form locking key connection
15 operating protrusions
16 operating recesses
17 groove, spline
18 tooth, block
19 central opening
20 groove, spline
21 tooth, block
22 groove, spline
23 tooth, block
24 central opening
25 groove, spline
26 tooth, block
27 lines
28 lines
29 rotation axis
30 socket part
31 clearance
100 endoscope
110 endoscope head
120 connection unit
131 manipulators
133 endoscope shaft
134 working channel
135 deflecting portion
136 segments
137 steering wires
140 supply line

What is claimed is:

1. A steering assembly for an endoscope, the steering assembly comprising:
a first steering member rotatable around a rotation axis for bending a tip of the endoscope in a first directional plane, the first steering member comprising form locking elements including grooves and teeth arranged in an alternating manner;
a first wire drum;
a second steering member rotatable around the rotation axis for bending the tip of the endoscope in a second directional plane, the second steering member comprising form locking elements including grooves and teeth extending radially inward, the grooves and the teeth being arranged circularly in an alternating manner;
a second wire drum;
a first shaft comprising form locking elements including grooves and teeth, the grooves and the teeth being arranged in an alternating manner and mechanically engaged with the form locking elements of the first steering member to form a first form locking key connection for transmitting a torque induced by the first steering member to the first wire drum, mechanically engaged comprising the teeth of first steering member being positioned in the grooves of the first shaft and the teeth of first shaft being positioned in the grooves of the first steering member; and
a second shaft comprising form locking elements including grooves and teeth extending radially outward, the grooves and the teeth being arranged circularly in an alternating manner and mechanically engaged with the second steering member to form a second form locking key connection for transmitting a torque induced by the second steering member to the second wire drum, the first shaft and the second shaft being coaxial to each other, mechanically engaged comprising the teeth of second steering member being positioned in the grooves of the second shaft and the teeth of second shaft being positioned in the grooves of the second steering member,
wherein the second steering member comprises a hollow cylindrical socket part provided with the form locking elements of the second form locking key connection, and wherein the socket part engages into a clearance between the first shaft and the second shaft.

2. The steering assembly of claim 1, wherein the form locking elements of the first steering member and the first shaft are conical in a direction radial to a rotation axis.

3. The steering assembly of claim 2, wherein the form locking elements of the first steering member and the first shaft comprise deformation areas to reduce or eliminate play between the first steering member and the first shaft and/or between the second steering member and the second shaft.

4. The steering assembly of claim 1, wherein the form locking elements of the first steering member and the first shaft and/or of the second steering member and the second shaft comprise deformation areas to reduce or eliminate play between the first steering member and the first shaft and/or between the second steering member and the second shaft.

5. The steering assembly of claim 1, wherein the second form locking key connection is arranged at least in part axially inside the first form locking key connection.

6. The steering assembly of claim 5, wherein the second form locking key connection is arranged completely axially inside the first form locking key connection.

7. The steering assembly of claim 1, wherein the first steering member and the first shaft and/or the second steering member and the second shaft each are made from plastic/resin.

8. The steering assembly of claim 7, wherein the first steering member and the first shaft and/or the second steering member and the second shaft each are injection molded.

9. The steering assembly of claim 8, wherein the first shaft and the first wire drum are molded in one piece, and wherein the second shaft and the second wire drum are molded in one piece.

10. The steering assembly of claim 9, wherein first steering member is positioned between the second steering member and the second wire drum.

11. The steering assembly of claim 1, wherein the first form locking key connection and/or the second form locking key connection is/are made from plastic material.

12. The steering assembly of claim 1, wherein the first form locking key connection and the second from locking key connection overlap each other in a direction of the rotation axis.

13. The steering assembly of claim 1, wherein the form locking elements of the first shaft engage into a central opening of the first steering member.

14. The steering assembly of claim 13, wherein the second shaft is arranged within the first shaft.

15. The steering assembly of claim 1, wherein the form locking elements of the first steering member and the first shaft are conical in a direction of the rotation axis.

16. The steering assembly of claim 15, wherein the form locking elements of the first steering member and the first shaft comprise deformation areas to reduce or eliminate play between the first steering member and the first shaft and/or between the second steering member and the second shaft.

17. The steering assembly of claim 1, wherein the form locking elements of the first steering member extend in parallel, and wherein the form locking elements of the first shaft extend in parallel.

18. The steering assembly of claim 1, wherein the second steering member comprises a central socket part, and wherein the central socket part comprises a central opening and the form locking elements of the second steering member, the form locking elements extending radially inward in the central opening.

* * * * *